United States Patent
Jiang

(10) Patent No.: US 10,869,347 B2
(45) Date of Patent: Dec. 15, 2020

(54) WIRELESS PAIRING SYSTEM AND METHOD

(71) Applicant: SHENZHEN MINGZONG TECHNOLOGY CO., LTD., Guangdong (CN)

(72) Inventor: Zhizhou Jiang, Guangdong (CN)

(73) Assignee: SHENZHEN MINGZONG TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 16/262,950

(22) Filed: Jan. 31, 2019

(65) Prior Publication Data

US 2019/0208556 A1    Jul. 4, 2019

Related U.S. Application Data

(63) Continuation of application No. PCT/CN2017/119713, filed on Dec. 29, 2017.

(51) Int. Cl.
*H04W 76/11* (2018.01)
*H04W 4/80* (2018.01)
(Continued)

(52) U.S. Cl.
CPC ............ *H04W 76/14* (2018.02); *H04W 4/80* (2018.02); *H04W 8/005* (2013.01); *H04W 76/00* (2013.01); *H04W 76/11* (2018.02)

(58) Field of Classification Search
CPC ....... H04W 76/14; H04W 4/80; H04W 8/005; H04W 76/11; H04W 76/00
(Continued)

(56) References Cited

U.S. PATENT DOCUMENTS 9,198,115 B2 *  11/2015  Vleugels ............... H04W 48/14
10,231,128 B1 *  3/2019  Ziraknejad .......... H04L 63/0428
(Continued)

FOREIGN PATENT DOCUMENTS

| CN | 102542768 | 7/2012 |
| CN | 103780762 | 5/2014 |

(Continued)

OTHER PUBLICATIONS

"International Search Report (Form PCT/ISA/210)", dated Sep. 14, 2018, pp. 1-4.

*Primary Examiner* — Phong La
(74) *Attorney, Agent, or Firm* — JCIPRNET

(57) ABSTRACT

A wireless pairing system includes an emitting terminal and a receiving terminal, the emitting terminal includes an emitting terminal storage unit, a traversal unit, a coupling unit, an emitting terminal wireless transceiver and a capacitor unit. The receiving terminal includes an electrical pulse signal sender, a receiving terminal storage unit, a detecting unit, a coupling receiver and a receiving terminal wireless transceiver. Matching/coupling mode of the emitting terminal is operated by selectively sending electrical pulse signals. That is the receiving terminal can receive matching requests from the emitting terminal last successively connected in priority to shorten pairing cycle, and to improve pairing efficiency between the emitting terminal and the receiving terminal; or the receiving terminal can receive a coupling request sent form any of emitting terminals detectable directly, so as to provide an optional pairing course with high witching efficiency.

16 Claims, 3 Drawing Sheets

(51) Int. Cl.
*H04W 76/14* (2018.01)
*H04W 76/00* (2018.01)
*H04W 8/00* (2009.01)

(58) Field of Classification Search
USPC .......................................................... 370/329
See application file for complete search history.

(56) References Cited

U.S. PATENT DOCUMENTS

| | | |
|---|---|---|
| 2013/0210357 A1 | 8/2013 | Qin et al. |
| 2014/0206288 A1* | 7/2014 | Liu .................. H04W 12/04 455/41.2 |
| 2015/0050879 A1 | 2/2015 | MacDuff et al. |
| 2016/0260319 A1* | 9/2016 | Jeffery .................. G08C 17/02 |
| 2016/0360350 A1* | 12/2016 | Watson .................. H04L 67/16 |
| 2017/0195600 A1* | 7/2017 | Lin ...................... H04N 5/369 |
| 2017/0242653 A1* | 8/2017 | Lang ...................... H04R 27/00 |
| 2017/0323560 A1 | 11/2017 | Zhou et al. |
| 2018/0270340 A1* | 9/2018 | Ahmad .............. H04W 12/0608 |
| 2019/0082018 A1* | 3/2019 | Sabur .................. H04L 67/16 |
| 2019/0132139 A1* | 5/2019 | Hillaert .............. H04L 12/2856 |
| 2020/0015301 A1* | 1/2020 | Zhang .................... H04L 29/06 |

FOREIGN PATENT DOCUMENTS

| | | |
|---|---|---|
| CN | 105519005 | 4/2016 |
| CN | 105741532 | 7/2016 |
| EP | 2627110 | 8/2013 |
| EP | 3025434 | 6/2016 |
| EP | 3217373 | 9/2017 |
| JP | 2015515161 | 5/2015 |
| JP | 2017537554 | 12/2017 |
| WO | 2013117107 | 8/2013 |
| WO | 2015013546 | 1/2015 |
| WO | 2016091023 | 6/2016 |

* cited by examiner

WIRELESS PAIRING SYSTEM AND METHOD

CROSS-REFERENCE TO RELATED APPLICATION

This application is a continuation of international PCT application serial no. PCT/CN2017/119713, filed on Dec. 29, 2017. The entirety of the above-mentioned patent application is hereby incorporated by reference herein and made a part of this specification.

BACKGROUND OF THE INVENTION

1. Field of the Invention

The present disclosure relates to wireless communication, and more particularly, to a wireless pairing system and wireless pairing method.

2. Description of Related Art

In wireless communication application environments between an emitting terminal and a receiving terminal, it is required that a precedent pairing process between the emitting terminal and the receiving terminal should be carried out, and then a subsequent communication can be executed. In a conventional manual pairing condition, identification codes of the opposite party should be respectively inputted by the emitting terminal or the receiving terminal, or pairing buttons should be activated respectively, thereby a pairing process being carried out.

Due to far distance between the emitting terminal and the receiving terminal, it is impossible for an individual to simultaneously operate the emitting terminal and the receiving terminal. Therefore, a wireless pairing system is provided, to make the emitting terminal and the receiving terminal automatically carry out a pairing process; or to accomplish the pairing process between the emitting terminal and the receiving terminal by single ended controlling.

CONTENTS OF THE DISCLOSURE

To solve the aforementioned technical problem, objectives of embodiments of the present disclosure are to provide a wireless pairing system.

The wireless pairing system includes an emitting terminal and a receiving terminal, and the receiving terminal is electrically connected with the emitting terminal.

Wherein, the emitting terminal includes an emitting terminal storage unit, a traversal unit, a coupling unit, an emitting terminal wireless transceiver, and a capacitor unit;

the emitting terminal storage unit is adapted to store an identifier list of receiving terminals having been connected with the emitting terminal ever, on condition that the capacitor unit is uncharged, the traversal unit is adapted to successively send matching requests to the receiving terminals in the identifier list of receiving terminals, until the emitting terminal wireless transceiver receives a matching response, on condition that the capacitor unit is charged, the coupling unit is adapted to transmit coupling requests to detectable receiving terminals until the emitting terminal wireless transceiver receives a coupling response, and the emitting terminal wireless transceiver is adapted to detect receipts of matching responses or coupling responses; on condition of a receipt of a matching response or a coupling response, to determine the receiving terminal corresponding to received matching response or received coupling response as a target receiving terminal, and to set up a communication connection with the target receiving terminal;

the receiving terminal includes:

an electrical pulse signal sender, adapted to send electrical pulse signals to the emitting terminal, when the electrical pulse signal sender sends electrical pulse signals to the emitting terminal, the capacitor unit of the emitting terminal is charged; when the electrical pulse signal sender sends no electrical pulse signal to the emitting terminal, the capacitor unit is uncharged;

a receiving terminal storage unit, adapted to store an emitting terminal identifier of an emitting terminal last paired with the receiving terminal, a detecting unit, adapted to detect a receipt of a matching request from the emitting terminal last paired with the receiving terminal, on condition that the electrical pulse signal sender sends no electrical pulse signal to the emitting terminal;

a coupling receiver, adapted to detect a receipt of a coupling request, on condition that the electrical pulse signal sender sends no electrical pulse signal to the emitting terminal; and a receiving terminal wireless transceiver, adapted to determine the emitting terminal corresponding to received matching request or received coupling request as a target emitting terminal, on condition that the detecting unit receives the matching request or the coupling receiver receives the coupling request, and to build a communication connection with the target emitting terminal.

In one embodiment of the present invention, the traversal unit is further adapted to sort receiving terminal identifiers in the identifier list of receiving terminals, according to time tab corresponding to each receiving terminal identifier, the time tab is a history pairing time between the receiving terminal and the emitting terminal in accordance with relating receiving terminal identifier, and the sorting is carried out on the basis of interval values between a history pairing time and a current time in smallest to largest order.

In one embodiment of the present invention, the receiving terminal further comprises a triggering unit, when the triggering unit is activated, the electrical pulse signal sender sends electrical pulse signals to the emitting terminal.

In one embodiment of the present invention, the coupling unit is further adapted to send coupling requests in a first preset time to detectable receiving terminals, and to cease sending coupling requests to detectable receiving terminals in condition of no coupling response received by the emitting terminal wireless transceiver.

In one embodiment of the present invention, the traversal unit is further adapted to successively transmit matching requests to receiving terminals in the identifier list of receiving terminals, when a second preset time is up after the coupling unit ceases sending coupling requests to the detectable receiving terminal, until the emitting terminal wireless transceiver gets a matching response.

In one embodiment of the present invention, the emitting terminal is engaged with a first device, the receiving terminal is engaged with a second device comprising a power supply. On condition that an electrical connection is set between the second device and the first device, the second device is adapted to transmit electricity of the power supply to the emitting terminal by the electrical connection, thereby the emitting terminal is powered.

In one embodiment of the present invention, the first device is a detachable locomotive, the second device is a detachable container connected with the detachable locomotive, and the receiving terminal is a display devices engaged with the detachable locomotive, the emitting terminal is a camera equipment disposed on the detachable container.

In another aspect of the present invention, a launching method of wireless pairing is disclosed, the method comprises:

diagnosing capacitor unit to judge if the capacitor unit is charged;

if uncharged, successively transmitting matching requests to receiving terminals in an identifier list of receiving terminals, until an emitting terminal wireless transceiver receives a matching response;

if charged, transmitting coupling requests to detectable receiving terminals, until the emitting terminal wireless transceiver receives a coupling response;

detecting receipts of the matching response or the coupling response, on condition of a receipt of the matching response or the coupling response, determining the receiving terminal sending the matching response or the coupling response as a target receiving terminal, and set up a communication connection with the target receiving terminal.

In one embodiment of the present invention, the step of successively transmitting matching requests to receiving terminals in an identifier list of receiving terminals comprises:

sorting receiving terminal identifiers in the identifier list of receiving terminals, according to time tab corresponding to each receiving terminal identifier, the time tab is a history pairing time between the receiving terminal and the emitting terminal in accordance with relating receiving terminal identifier, and the sorting is carried out on the basis of interval values between a history pairing time and a current time in smallest to largest order.

In one embodiment of the present invention, the step of transmitting coupling requests to detectable receiving terminals comprises:

ceasing pairing process, within a first preset time for successively transmitting coupling requests to detectable receiving terminals, without receipt of the coupling response; or suspending pairing process, and after a second preset time, successively transmitting coupling requests to receiving terminals in the identifier list of receiving terminals, until a coupling response is received.

In another aspect of the present invention, a wireless pairing method of receiving terminal is provided, the method comprises the following steps:

detecting a receipt of an instruction to generate electrical pulse signals;

if no instruction detected, detecting a receipt of a matching request sent by an emitting terminal, last paired with a receiving terminal;

if an instruction detected, detecting a receipt of a coupling request;

determining the emitting terminal corresponding to received matching request or received coupling request as a target emitting terminal, on condition that the detecting unit receives the matching request or the coupling receiver receives the coupling request, and building a communication connection with the target emitting terminal.

Effective results of the embodiment of the present disclosure are listed below: a receiving terminal controls a matching/coupling mode by selectively sending electrical pulse signals. That is the receiving terminal can receive matching requests in priority sent by an emitting terminal last paired with the receiving terminal successfully to cut down a pairing cycle effectively; and the receiving terminal can directly receive coupling requests sent by any one of emitting terminals detectable, so as to set up a wireless connection with high flexibility and height efficiency of mode switching.

DETAILED DESCRIPTION OF THE DISCLOSURE

To make the objective, technical solutions and advantages of the present disclosure clearer, the present disclosure will be further detailed with reference to specific embodiments thereof and the attached drawings. It is understood that the embodiments of the present invention are elaborated to construe the present invention, and not to limit technical solutions of this application.

Figure 1:
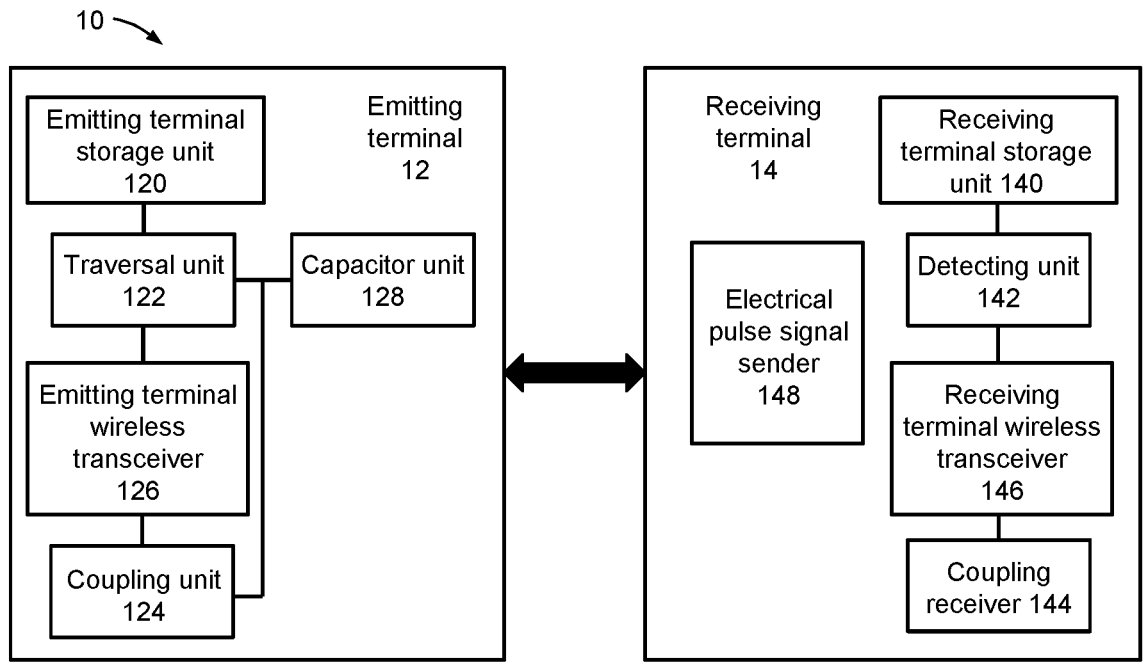
FIG. 1 is a schematic view of a wireless pairing system in one embodiment of the present disclosure.

Referring to FIG. 1, according to one embodiment of the present disclosure, a wireless pairing system 10 is provided, the system 10 includes an emitting terminal 12 and a receiving terminal 14. In realistic practice, more than one emitting terminal 12 and more than one receiving terminal 14 can be adopted, therefore, for a specific emitting terminal/receiving terminal, a preceding pairing process should be carried out between the specific emitting terminal/receiving terminal and an available receiving terminal/emitting terminal. Only after the preceding pairing process, can the emitting terminal communicate with the receiving terminal.

It should be noted that the terms in present disclosure "emitting terminal" and "receiving terminal" are not restricted only referring to a terminal of transmitting or a terminal of taking over. The emitting terminal can accept communicating signals at some stage, the communicating signals include but not limited to feedback signals sent by a receiving terminal. The receiving terminal can send communicating signals at some stage, the communicating signals include but not limited to feedback signals and so on from a receiving terminal indicating to the emitting terminal a refusal or an acceptance.

Referring to FIG. 1, the emitting terminal 12 includes an emitting terminal storage unit 120, a traversal unit 122, a coupling unit 124, an emitting terminal wireless transceiver 126, and a capacitor unit 128.

Wherein, the emitting terminal storage unit 120 is used for storing an identifier list of receiving terminals with information of receiving terminals 14 having been paired with emitting terminals 12 in history record. In real practice, the emitting terminal 12 and the receiving terminal 14 are usually arranged in a set matching. In a nonrestrictive embodiment, the emitting terminal can be a wireless speaker, the receiving terminal can be a smartphone, notebook, palmtop, etc. In general, according to customer habits, the wireless speaker normally set up a communication connection by blue tooth module of a smartphone. Therefore, it is preferred that an identifier list of receiving terminals is stored in the wireless speaker, for recording a list of receiving terminals having been paired with the wireless speaker in history record.

On the condition that the capacitor unit 128 is uncharged, the traversal unit 122 is adapted to successively send matching requests to the receiving terminals 14 in the identifier list of receiving terminals, until the emitting terminal wireless transceiver 126 receives a matching response.

Preferably, the traversal unit 122 is further adapted to sort receiving terminal identifiers in the identifier list of receiving terminals, according to time tab corresponding to each receiving terminal identifier, the time tab is a history pairing time between the receiving terminal and the emitting terminal in accordance with relating receiving terminal identifier, and the sorting is carried out on the basis of interval values between a history pairing time and a current time in smallest to largest order. It should be noted that if an emitting terminal 12 has been paired with a receiving terminal 14 for many time in history, the receiving terminal 14 is only recorded one time in the identifier list of receiving terminals, and time tab corresponding to the receiving terminal is the history pairing time when the receiving terminal is paired with the emitting terminal at last time. Regarding the embodiment to the above described wireless speaker, receiving devices having been paired ever are recorded in the wireless speaker, such as smartphone, laptop, palmtop and so forth, and only the last history pairing record are stored.

It is further noted that although the traversal unit 122 sorts the identifier list of receiving terminals in the above illustration, in another embodiment, the identifier list of receiving terminals is sorted according to history pairing time when a pairing process is carried out between the receiving terminals in the list and a specific receiving terminal, and the traversal unit 122 sends matching requests in accordance with chronological order of last history paring time in last time to the receiving terminals in the identifier list of receiving terminals.

On the condition that the capacitor unit 128 is charged, the coupling unit 124 is adapted to transmit coupling requests to detectable receiving terminals.

In another embodiment, the coupling unit 124 successively sends out coupling requests to detectable receiving terminals. It is preferred that in each pairing process, after a preset time the coupling unit 124 send out a coupling request to a receiving terminal 14 available for connection, it is need that the emitting terminal wireless transceiver 126 is detected a receipt of a matching response; if no matching response received, go on pairing process.

The emitting terminal wireless transceiver 126 is adapted to detect receipts of matching responses or coupling responses, on condition of receipts of a matching response or a coupling response, to determine the receiving terminal 14 corresponding to received matching response or received coupling response as a target receiving terminal, and to set up a communication connection with the target receiving terminal.

In the aforementioned embodiment, working state of the emitting terminal is operated by controlling charging state of the capacitor 128. i.e., it is convenient for operation and fast to switch working mode by choosing traversing all the receiving terminals successively paired in history record or choosing a generic pairing mode.

In a preferred embodiment, the coupling unit 124 is further adapted to send coupling requests in a first preset time to detectable receiving terminals, and to cease sending coupling requests to detectable receiving terminals in condition of no coupling response received by the emitting terminal wireless transceiver 126.

In detail, it is presumed that the first preset time is 60 seconds, it means that the system 10 will assign 60 seconds to the coupling unit 124 to send coupling requests, if the emitting terminal wireless transceiver 126 receives no coupling response within the 60 seconds. It is inferred that no receiving terminal 14 receives or accepts the coupling requests, and the coupling request process is failed. For energy source saving purpose, stop emitting coupling requests.

It is further preferred that the traversal unit 122 is further adapted to successively transmit matching requests to receiving terminals 14 in the identifier list of receiving terminals again, when a second preset time is up after the coupling unit 124 ceases sending coupling requests to the detectable receiving terminal, until the emitting terminal wireless transceiver 126 gets a matching response.

In details, it is presumed that the second preset time is 3 minutes, it means that the system 10 will continue to send out matching requests when the 3 minutes is up after stopping emitting coupling requests. Moreover, the receiving terminals 14 to be sent matching requests are restricted to be selected from the receiving terminal 14 listed in the identifier list of receiving terminals.

The receiving terminal 14 includes:

an electrical pulse signal sender 148, is adapted to send electrical pulse signals to the emitting terminal 12, when the electrical pulse signal sender 148 sends electrical pulse signals to the emitting terminal 12, the capacitor unit 128 of the emitting terminal 15 is charged; when the electrical pulse signal sender 148 sends no electrical pulse signal to the emitting terminal 12, the capacitor unit 128 is uncharged;

a receiving terminal storage unit 140, is adapted to store an emitting terminal identifier of an emitting terminal last paired with the receiving terminal;

a detecting unit 142, is adapted to detect a receipt of a matching request from the emitting terminal 12 last paired with the receiving terminal 14, on condition that the electrical pulse signal sender 148 sends no electrical pulse signal to the emitting terminal 12;

a coupling receiver 144, is adapted to detect a receipt of a coupling request, on condition that the electrical pulse signal sender 148 sends electrical pulse signals to the emitting terminal 12; and a receiving terminal wireless transceiver 146, is adapted to determine the emitting terminal 12 corresponding to received matching request or received coupling request as a target emitting terminal, on condition that the detecting unit 142 receives the matching request or the coupling receiver 144 receives the coupling request, and to build a communication connection with the target emitting terminal.

In details, take a smartphone as an example of receiving terminal 14. To be a receiving terminal 14, the smartphone has been paired with a wireless camera, a wireless earphone, a wireless speaker by coupling request means. The smartphone only stores one emitting terminal 12 having successfully paired with the smartphone in most recently pairing process, for example, the last paired emitting terminal 12 in history is the wireless earphone. The smartphone detects to confirm a transmission of electrical pulse signals, if no electrical pulse signal is sent, it is first to detect a receipt of a matching request from the wireless earphone. Because, in real practice, the receiving terminal 14 prefers to continue to pair with the emitting terminal 12 having been successfully connected in previous time, for example, in a communication course between the smartphone and the wireless earphone, except for an artificial breaking down of the communication connection, message signals interrupts, power down, and so forth are the most common causes resulting in communication breaking down. Under such circumstances, the receiving terminal 14, i.e., the smartphone still needs to pair again with the emitting terminal 12, i.e., the wireless earphone successfully paired in previous time after being powered on again or signal recovery, so as to continue previous communicating procedure.

If electrical pulse signals are sent, and the receiving terminal 14, i.e., the smartphone initiates the generic pairing mode. That is utilizing the coupling receiver 144 to check a receipt of a coupling request. It is preferred that the checking procedure will be paused when a coupling request is detected by the coupling receiver 144.

Figure 2:
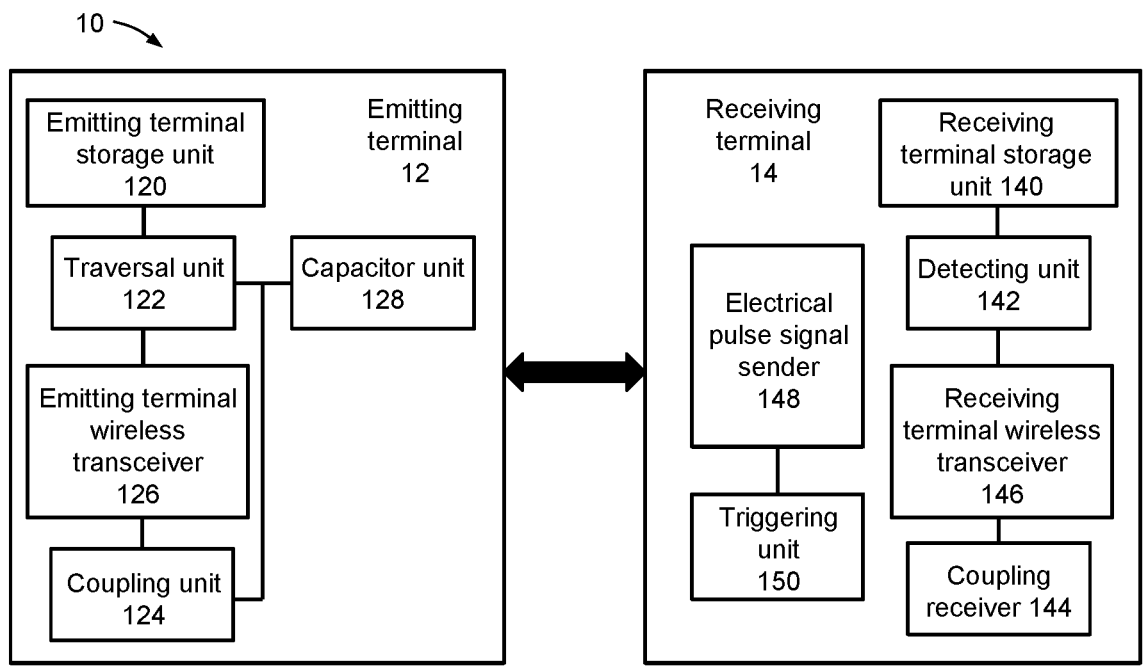
FIG. 2 is a schematic view of a wireless pairing system in another embodiment of the present disclosure.

Referring to FIG. 2, the receiving terminal 14 further includes a triggering unit 150. When the triggering unit 150 is activated, the coupling receiver 144 executes the step of detecting a receipt of a coupling request.

and the receiving terminal 14, such as a smartphone, fails to get the matching request from the emitting terminal 12 successfully paired in previous time, that is the wireless earphone, the receiving terminal 14 will activate the generic pairing mode of the receiving terminal. That is utilizing the coupling receiver 144 to check a receipt of a coupling request. It is preferred that the checking procedure will be paused when a coupling request is detected by the coupling receiver 144.

As shown in FIG. 2, in a preferred embodiment, the receiving terminal 14 further includes a triggering unit 150. When the triggering unit 150 is activated, the electrical pulse signal sender 148 sends electrical pulse signals to the emitting terminal 12.

In present embodiment, the coupling receiver 144 no longer diagnoses whether the detecting unit 142 would receive a matching request send by the emitting terminal 12 last paired with the receiving terminal 14 or no, and only the triggering unit 150 is activated, the following step is executed: detecting a receipt of a coupling request.

In another embodiment, the emitting terminal 12 is engaged with a first device, the receiving terminal 14 is engaged with a second device including a power supply. On condition that an electrical connection is set between the second device and the first device, the second device is adapted to transmit electricity of the power supply to the emitting terminal by the electrical connection, thereby the emitting terminal is powered.

Combined with the above illustration, if the emitting terminal 12 is independently powered, the emitting terminal will continuously send out matching requests or coupling requests unless the emitting terminal 12 successfully connected with the receiving terminal 14. Or when a second preset time is up after interruptions, the emitting terminal will repeat a cycle of sending matching requests. Thus, the second device engaged with the receiving terminal 14 provides power supply to the first device engaged with the emitting terminal 12, which can efficiently conserve energy of the system 10, as elaborated in the detailed embodiment 1 below.

DETAILED EMBODIMENT

In present detailed embodiment, the first device can be a detachable locomotive, the second device can be a detachable container engaged with the detachable locomotive. The receiving terminal 14 can be a display device disposed on the detachable locomotive, and the emitting terminal 12 can be a camera equipment mounted onto the detachable container.

The camera equipment includes an emitting terminal storage unit 120, a traversal unit 122, a coupling unit 124, an emitting terminal wireless transceiver 126 and a capacitor 128.

Wherein, the emitting terminal storage unit 120 is adapted to store an identifier list of receiving terminals of display devices having been paired with the camera equipment in history.

On condition that the capacitor unit is uncharged, the traversal unit 122 is adapted to successively transmit matching requests to the display devices in the identifier list of receiving terminals, until the emitting terminal wireless transceiver 126 receives a matching response.

It is preferred that the traversal unit 122 is further adapted to sort receiving terminal identifiers in the identifier list of receiving terminals, according to time tab corresponding to each receiving terminal identifier, the time tab is a history pairing time between the receiving terminal and the emitting terminal in accordance with relating receiving terminal identifier, and the sorting is carried out on the basis of interval values between a history pairing time and a current time in smallest to largest order. It should be noted that if a camera equipment has paired with a display device for many times in history, only one connection record of the display device is logged in the identifier list of receiving terminals, and the time tab of the display device is the history pairing time when the display device is paired with the camera equipment in last time.

It should be clarified, although described above, the traversal unit 122 sorts the identifier list of receiving terminals. In an alternative embodiment, the identifier list of receiving terminals is sorted according to history pairing time when a pairing process is carried out between the display devices in the list and a specific camera equipment. The traversal unit 122 sends matching requests in accordance with chronological order of history paring time to the receiving terminals in the identifier list of receiving terminals in last pairing process.

On condition that the capacitor unit 128 is charged, the coupling unit 124 is adapted to transmit coupling requests to detectable receiving terminals 14, until the the emitting terminal wireless transceiver 126 receives coupling response.

In another embodiment, the coupling unit 124 successively transmit coupling requests to detectable receiving terminals. It is preferred that in each pairing process, after a preset time the coupling unit 124 send out a coupling request to a display device available for connection, it is need that the emitting terminal wireless transceiver 126 is detected a receipt of a matching response by the coupling unit 124; if no matching response received, go on pairing process.

In a preferred embodiment, the emitting terminal wireless transceiver 126 is adapted to detect receipts of matching responses or coupling responses, on condition of receipts of a matching response or a coupling response, to determine the display device corresponding to received matching response or received coupling response as a target receiving terminal, and to set up a communication connection with the target receiving terminal.

In a preferred embodiment, the coupling unit 124 is further adapted to send coupling requests in a first preset time to detectable receiving terminals, and to cease sending coupling requests to detectable receiving terminals in condition of no coupling response received by the emitting terminal wireless transceiver 126.

In details, for example, the first preset time is 60 seconds, it means that the system 10 will assign 60 seconds to the coupling unit 124 to send coupling requests, if the emitting terminal wireless transceiver 126 receives no coupling response within the 60 seconds. It is inferred that no display device receives or accepts the coupling requests, and the coupling request process is failed. For energy source saving purpose, stop emitting coupling requests.

In a further preferred embodiment, the traversal unit 122 is further adapted to successively transmit matching requests to display devices in the identifier list of receiving terminals, when a second preset time is up after the coupling unit 124 ceases sending coupling requests to the detectable receiving terminal, until the emitting terminal wireless transceiver 126 gets a matching response.

In detail, it is presumed that the second preset time is 3 minutes, it means that the system 10 will continue to send out matching requests when the 3 minutes is up after stopping emitting coupling requests. Moreover, the receiving terminals 14 to be sent matching requests are restricted to be selected from the display devices listed in the identifier list of receiving terminals.

The display device includes:

an electrical pulse signal sender 148, adapted to send electrical pulse signals to the emitting terminal 12, when the electrical pulse signal sender 148 sends electrical pulse signals to the emitting terminal 12, the capacitor unit 128 of the emitting terminal 12 is charged, and the capacitor unit 128 is electrified; when the electrical pulse signal sender 148 sends no electrical pulse signal to the emitting terminal 12, the capacitor unit 128 is uncharged;

a receiving terminal storage unit 140, is adapted to store an emitting terminal identifier of a camera equipment last paired with the display device;

a detecting unit 142, is adapted to detect a receipt of a matching request from the camera equipment last paired with the display device, on condition that the electrical pulse signal sender 148 sends no electrical pulse signal to the emitting terminal 12;

a coupling receiver 144, is adapted to detect a receipt of a coupling request, on condition that the electrical pulse signal sender 148 sends no electrical pulse signal to the emitting terminal 12; and a receiving terminal wireless transceiver 146, is adapted to determine the camera equipment corresponding to received matching request or received coupling request as a target emitting terminal, on condition that the detecting unit 142 receives the matching request or the coupling receiver 144 receives the coupling request, and to build a communication connection with the target emitting terminal.

In a preferred embodiment, the display device further includes a triggering unit 150. When the triggering unit 150 is activated, the electrical pulse signal sender 148 sends electrical pulse signals to the emitting terminal 12.

In present embodiment, the coupling receiver 144 no longer diagnoses whether the detecting unit 142 would receive a matching request send by the camera equipment last paired with the display device or no, and only the triggering unit 150 is activated, the following step is executed: detecting a receipt of a coupling request.

Figure 3:
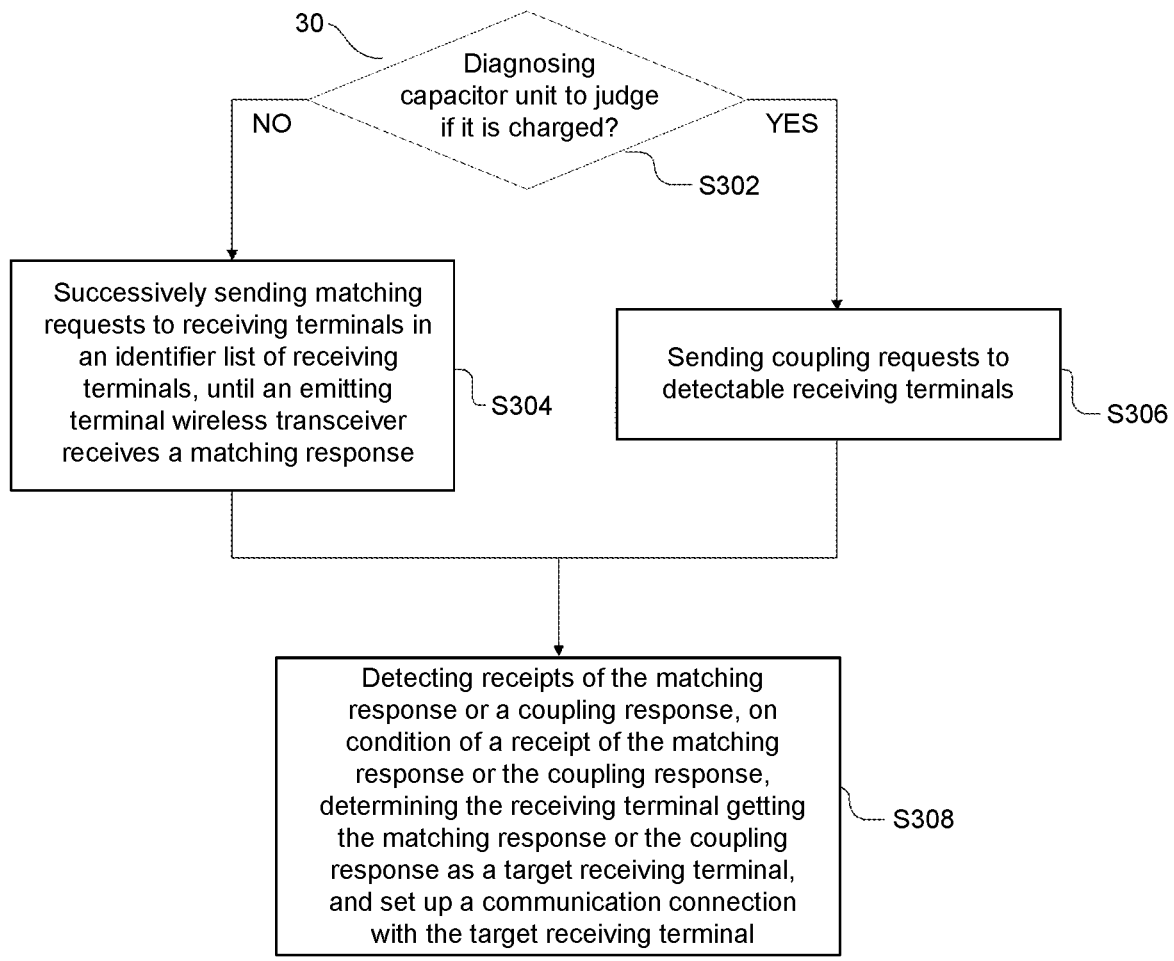
FIG. 3 is a flow chart of a launching method of wireless pairing in another embodiment of the present disclosure.

According to another aspect of the present disclosure, as referring to FIG. 3, a launching method of wireless pairing 30 is provided. The method is engaged with an emitting terminal of a wireless communication system having emitting terminals and receiving terminals.

The method includes:

S302, diagnosing capacitor unit to judge if the capacitor unit is charged;

if uncharged, executing S304, successively sending matching requests to receiving terminals in an identifier list of receiving terminals, until the emitting terminal wireless transceiver receives a matching response;

if charged, executing S306, sending coupling requests to detectable receiving terminals;

S308, detecting receipts of the matching response or a coupling response, on condition of a receipt of the matching response or the coupling response, determining the receiving terminal getting the matching response or the coupling response as a target receiving terminal, and set up a communication connection with the target receiving terminal.

In one embodiment, step S304 includes: sorting receiving terminal identifiers in the identifier list of receiving terminals, according to time tab corresponding to each receiving terminal identifier, the time tab is a history pairing time between the receiving terminal and the emitting terminal in accordance with relating receiving terminal identifier, and the sorting is carried out on the basis of interval values between a history pairing time and a current time in smallest to largest order.

In one embodiment, step S306 includes: ceasing pairing process, within a first preset time for successively transmitting coupling requests to detectable receiving terminals, without receipt of the coupling response;

or suspending pairing process, and after a second preset time, successively transmitting coupling requests to receiving terminals in the identifier list of receiving terminals, until a coupling response is received.

Figure 4:
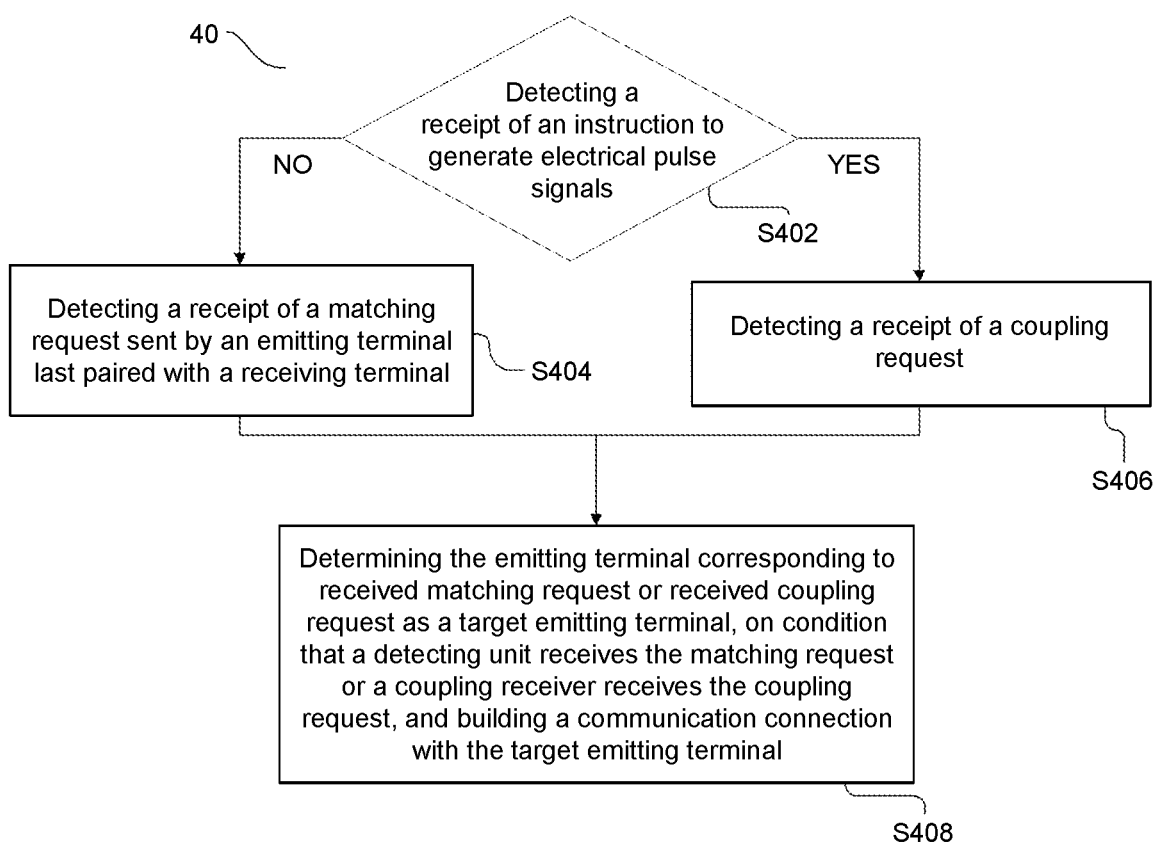
FIG. 4 is a flow chart of a wireless pairing method of a receiving terminal in another embodiment of the present disclosure.

According to another aspect of the present disclosure, as referring to FIG. 4, a receiving terminal wireless pairing method 40 is provided. The receiving terminal wireless pairing method 40 are applied in a receiving terminal of a wireless communication system having emitting terminals and receiving terminals, including steps of belows:

S402, detecting a receipt of an instruction to generate electrical pulse signals if instructed, executing S404, detecting a receipt of a matching request sent by an emitting terminal last paired with a receiving terminal;

if uninstructed, executing S406, detecting a receipt of a coupling request;

S408, determining the emitting terminal corresponding to received matching request or received coupling request as a target emitting terminal, on condition that a detecting unit receives the matching request or a coupling receiver receives the coupling request, and building a communication connection with the target emitting terminal.

What described above are embodiments of the present disclosure, and are not intended to limit embodiments the present technical disclosure. The embodiments described above are only schematic without restrictions. It should be noted that any modifications, equivalent replacements, and alterations made by those of ordinary skill in the art within the spirits and principles of the present technical disclosure shall be included in the scope of the present disclosure. In addition, some specific terms are applied in the present disclosure, for contributing to illustration of the present technical disclosure, which serves no grounds to any restriction.

The invention claimed is:

1. A wireless pairing system comprising: an emitting terminal and a receiving terminal, the receiving terminal electrically connected with the emitting terminal, wherein the emitting terminal comprises an emitting terminal storage unit, a traversal unit, a coupling unit, an emitting terminal wireless transceiver and a capacitor unit, the emitting terminal storage unit is adapted to store an identifier list of the receiving terminals previously connected with the emitting terminal, on condition that the capacitor unit is uncharged, the traversal unit is adapted to successively send matching requests to the receiving terminals in the identifier list of the receiving terminals, until the emitting terminal wireless transceiver receives a matching response;

on condition that the capacitor unit is charged, the coupling unit is adapted to transmit coupling requests to detectable receiving terminals, until the emitting terminal wireless transceiver receives a coupling response;

the emitting terminal wireless transceiver is adapted to detect receiving the matching response or the coupling response; on condition of receiving the matching response or the coupling response, to determine the receiving terminal corresponding to the received matching response or the received coupling response as a target receiving terminal, and to set up a communication connection with the target receiving terminal;

wherein the receiving terminal comprises:

an electrical pulse signal sender, adapted to send electrical pulse signals to the emitting terminal, when the electrical pulse signal sender sends the electrical pulse signals to the emitting terminal, the capacitor unit of the emitting terminal is charged; when the electrical pulse signal sender sends no electrical pulse signal to the emitting terminal, the capacitor unit is uncharged;

a receiving terminal storage unit, adapted to store an emitting terminal identifier of an emitting terminal last paired with the receiving terminal, a detecting unit, adapted to detect receiving a matching request from the emitting terminal last paired with the receiving terminal, on condition that the electrical pulse signal sender sends no electrical pulse signal to the emitting terminal;

a coupling receiver, adapted to detect receiving a coupling request, on condition that the electrical pulse signal sender sends no electrical pulse signal to the emitting terminal; and a receiving terminal wireless transceiver, adapted to determine the emitting terminal corresponding to received matching request or received coupling request as a target emitting terminal, on condition that the detecting unit receives the matching request or the coupling receiver receives the coupling request, and to build a communication connection with the target emitting terminal.

2. The wireless pairing system of claim 1, wherein the traversal unit is further adapted to sort receiving terminal identifiers in the identifier list of the receiving terminals, according to a time tab corresponding to each of the receiving terminal identifier, wherein the time tab is a history pairing time between the receiving terminal and the emitting terminal in accordance with the relating receiving terminal identifier, and the receiving terminal identifiers are sorted based on a time interval between a history pairing time and a current time in an order from small to large.

3. The wireless pairing system of claim 1, wherein the receiving terminal further comprises a triggering unit, when the triggering unit is activated, the electrical pulse signal sender sends the electrical pulse signals to the emitting terminal.

4. The wireless pairing system of claim 1, wherein the coupling unit is further adapted to send coupling requests to the detectable receiving terminals in a first preset time, and to cease sending coupling requests to the detectable receiving terminals in condition of no coupling response received by the emitting terminal wireless transceiver.

5. The wireless pairing system of claim 4, wherein the traversal unit is further adapted to successively transmit the matching requests to the receiving terminals in the identifier list of the receiving terminals, when a second preset time is up after the coupling unit ceases sending coupling requests to the detectable receiving terminals, until the emitting terminal wireless transceiver gets the matching response.

6. The wireless pairing system of claim 1, wherein the emitting terminal is engaged with a first device, the receiving terminal is engaged with a second device comprising a power supply, on condition that an electrical connection is set between the second device and the first device, the second device is adapted to transmit power from the power supply to the emitting terminal by the electrical connection, thereby the emitting terminal is powered.

7. The wireless pairing system of claim 6, wherein the first device is a detachable locomotive, the second device is a detachable container connected with the detachable locomotive, the receiving terminal is a display device engaged with the detachable locomotive, the emitting terminal is a camera equipment disposed on the detachable container.

8. A launching method of wireless pairing based on a wireless pairing system, wherein the wireless pairing system comprises an emitting terminal and a receiving terminal, the receiving terminal electrically connected with the emitting terminal, wherein the emitting terminal comprises an emitting terminal storage unit, a traversal unit, a coupling unit, an emitting terminal wireless transceiver and a capacitor unit, the emitting terminal storage unit is adapted to store an identifier list of the receiving terminals previously connected with the emitting terminal, the method comprising:

diagnosing the capacitor unit to judge if the capacitor unit is charged;

if the capacitor unit is uncharged, successively transmitting matching requests to the receiving terminals in the identifier list of the receiving terminals, until the emitting terminal wireless transceiver receives a matching response;

if the capacitor unit is charged, transmitting coupling requests to detectable receiving terminals, until the emitting terminal wireless transceiver receives a coupling response;

detecting receiving the matching response or the coupling response, on condition of receiving the matching response or the coupling response, determining the receiving terminal sending the matching response or the coupling response as a target receiving terminal, and set up a communication connection with the target receiving terminal, sending, by an electrical pulse signal sender of the receiving terminal, electrical pulse signals to the emitting terminal, when the electrical pulse signal sender sends the electrical pulse signals to the emitting terminal, the capacitor unit of the emitting terminal is charged; when the electrical pulse signal sender sends no electrical pulse signal to the emitting terminal, the capacitor unit is uncharged;

storing, by a receiving terminal storage unit of the receiving terminal, an emitting terminal identifier of an emitting terminal last paired with the receiving terminal, detecting, by a detecting unit of the receiving terminal, receiving a matching request from the emitting terminal last paired with the receiving terminal, on condition that the electrical pulse signal sender sends no electrical pulse signal to the emitting terminal;

detecting, by a coupling receiver of the receiving terminal, receiving a coupling request, on condition that the electrical pulse signal sender sends no electrical pulse signal to the emitting terminal; and determining, by a receiving terminal wireless transceiver of the receiving terminal, the emitting terminal corresponding to received matching request or received coupling request as a target emitting terminal, on condition that the detecting unit receives the matching request or the coupling receiver receives the coupling request, and to build a communication connection with the target emitting terminal.

9. The launching method of wireless pairing of claim 8, wherein the step of successively transmitting the matching requests to the receiving terminals in the identifier list of the receiving terminals comprises:

sorting receiving terminal identifiers in the identifier list of the receiving terminals, according to a time tab corresponding to each receiving terminal identifier, the time tab is a history pairing time between the receiving terminal and the emitting terminal in accordance with the relating receiving terminal identifier, and the receiving terminal identifiers are sorted based on a time interval between a history pairing time and a current time in an order from small to large.

10. The launching method of wireless pairing of claim 8, wherein the step of transmitting coupling requests to the detectable receiving terminals comprises:

ceasing pairing process, within a first preset time for successively transmitting the coupling requests to the detectable receiving terminals, without receiving the coupling response; or suspending pairing process, and after a second preset time, successively transmitting the coupling requests to the receiving terminals in the identifier list of the receiving terminals, until the coupling response is received.

11. The launching method of wireless pairing of claim 8, sorting, by the traversal unit, receiving terminal identifiers in the identifier list of the receiving terminals, according to a time tab corresponding to each of the receiving terminal identifier, wherein the time tab is a history pairing time between the receiving terminal and the emitting terminal in accordance with the relating receiving terminal identifier, and the receiving terminal identifiers are sorted based on a time interval between a history pairing time and a current time in an order from small to large.

12. The launching method of wireless pairing of claim 8, when a triggering unit of the receiving terminal is activated, the electrical pulse signal sender sends the electrical pulse signals to the emitting terminal.

13. The launching method of wireless pairing of claim 8, sending, by the coupling unit, coupling requests to the detectable receiving terminals in a first preset time, and to cease sending coupling requests to the detectable receiving terminals in condition of no coupling response received by the emitting terminal wireless transceiver.

14. The launching method of wireless pairing of claim 13, successively transmitting, by the traversal unit, the matching requests to the receiving terminals in the identifier list of the receiving terminals, when a second preset time is up after the coupling unit ceases sending coupling requests to the detectable receiving terminals, until the emitting terminal wireless transceiver gets the matching response.

15. The launching method of wireless pairing of claim 8, transmitting, a second device, power from the Power supply to the emitting terminal by the electrical connection, thereby the emitting terminal is powered, wherein the emitting terminal is engaged with a first device, the receiving terminal is engaged with the second device comprising a power supply, on condition that an electrical connection is set between the second device and the first device.

16. The launching method of wireless pairing of claim 15, wherein the first device is a detachable locomotive, the second device is a detachable container connected with the detachable locomotive, the receiving terminal is a display device engaged with the detachable locomotive, the emitting terminal is a camera equipment disposed on the detachable container.

\* \* \* \* \*